INVENTOR
Peter F. Kienast
BY Maury I. Hull
ATTORNEY

United States Patent Office 3,381,171
Patented Apr. 30, 1968

3,381,171
VARIABLE FREQUENCY MAGNETIC FIELD ARC HEATER APPARATUS AND VARIABLE FREQUENCY FIELD PRODUCING MEANS FOR USE THEREIN
Peter F. Kienast, Pittsburgh, Pa., assignor to Westinghouse Electric Corporation, Pittsburgh, Pa., a corporation of Pennsylvania
Filed Oct. 14, 1964, Ser. No. 403,812
11 Claims. (Cl. 315—176)

This invention relates to improvements in arc heater apparatus, and more particularly to arc heater apparatus utilizing a magnetic field for producing substantially continuous movement of the arc to prevent damage to the electrodes, and in which the direction of movement of the arc is periodically reversed at a frequency under the control of the operator of the apparatus.

It is well known in the arc heater art to utilize a magnetic field generally transverse to the arc between two electrodes to cause movement of the arc, which would otherwise quickly burn a hole in the electrode, and if the electrode were water cooled, the water would escape into the arc chamber with possible destruction of the arc heater apparatus. In high temperature arc heaters the arc must be moved even though the electrodes are water cooled, because the arc spot reaches instantaneous temperatures well above the melting point of most available electrode materials.

The speed with which the arc is rotated is not only a factor which must be considered in the cooling of the electrodes, but is also an important factor in the proper heating of the gases in the arc chamber. Furthermore, the stability of the arc is somewhat affected by the speed of arc movement, the problem of arc looping being related to the speed of movement. To optimize the heating of the gas obtained from the arc chamber, the speed of movement of the arc must be considered together with the densities, viscosities and electrical conductivities of the gases. Unidirectional arc rotation induces temperature gradients in the heating chamber due to centrifugal effects on the gases. These effects may result in a hot, less dense central core of gas which may still exist at the nozzle. The speed of rotation then, and the rate at which the direction of rotation is reversed, affect the stirring action and have an influence on the amount of temperature variation within the gas content.

In summary, my invention includes but is not limited to an arc heater having spaced water-cooled electrodes with coil means disposed in predetermined position with respect to the electrodes including a coil adjacent or within each electrode to set up an arc-moving magnetic field or fields, the coil means being energized by an alternating current of variable, controllable frequency, to facilitate proper mixing and heating of various gases in accordance with their densities, viscosities and electrical conductivities, to minimize the problem of arc looping and to stabilize the arc, and to provide a frequency of arc rotation which will reduce temperature variations within the gas.

The variable frequency alternating current for energizing the field coil of my invention is obtained in one embodiment of my invention from a direct current source which is supplied to four controlled rectifiers in a bridge arrangement with the field coils connected to the output of the bridge. The selective gating or firing of the controlled rectifiers is controlled from a variable frequency oscillator; during one alternation of the oscillator signal two of the controlled rectifiers conduct or are gated to pass current through the field coils in one direction, and during the next alternation of the oscillator control signal the other pair of controlled rectifiers conduct to pass current through the field coils in the other direction. Means are provided for restoring the waveform of the alternating current and for accommodating reactive effects and other transient effects in the circuit.

Accordingly, an object of my invention is to provide new and improved arc heater apparatus offering advantages over any now existing in the art.

Another object is to provide new and improved arc heater apparatus employing means for producing a magnetic field of variable frequency for controlling the movement of the arc around a pair of spaced electrodes.

A further object is to provide new and improved arc heater apparatus with full control of the movement of the arc to optimize heating conditions for gases of various densities, viscosities and electrical conductivities.

Still a further object is to provide new and improved arc heater apparatus with an adjustable magnetic field frequency to allow the time of rotation of the arc in a given direction to be varied to limit arc velocity thus minimizing the problem of arc looping.

Still an additional object is to provide an arc heater having a magnetic field for causing substantially continual movement of the arc, the magnetic field periodically varying in direction at an adjustable frequency thereby periodically varying the direction of movement of the arc.

These and other objects will become more clearly apparent after a study of the following specification, when read in connection with the accompanying drawings, in which:

FIG. 2 is a block diagram further illustrating the apparatus of FIG. 1; and

Figure 1:
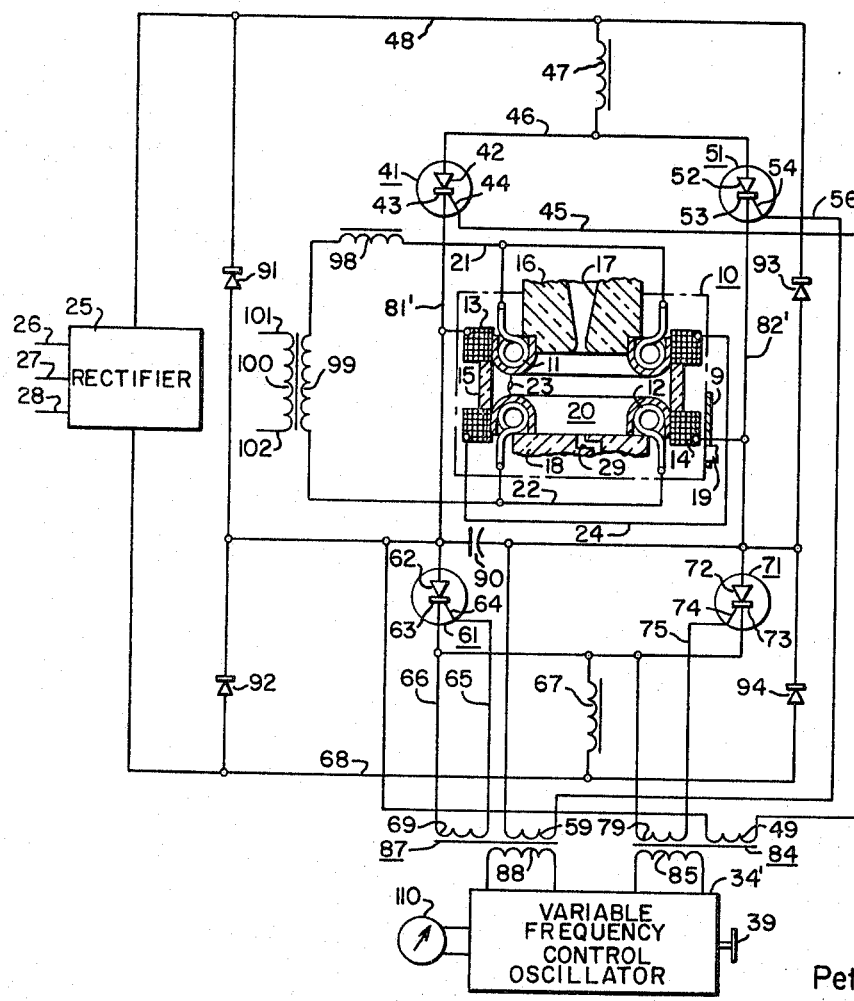
FIGURE 1 is an arc heater having a variable frequency magnetic field according to the preferred embodiment of my invention.

Referring now to the drawings, in which like reference numerals are used throughout to designate like parts for a more detailed understanding of the invention, and in particular to FIG. 1 thereof, the portion of the circuit enclosed in dashed line indicates an arc heater generally designated 10 having the essential features for utilizing my invention. The arc heater 10 is seen to include tank or housing 9, upper and lower water cooled electrodes 11 and 12, with field coils 13 and 14 adjacent the electrodes respectively and insulated therefrom, coils 13 and 14 being interconnected by lead 24, and a heat shield 15, which may be a high temperature ceramic, enclosing the space between the electrodes to form arc chamber 20 and preventing direct radiation from the electrodes and gases from falling upon the coils and housing walls 9. Adjacent the upper electrode is a nozzle 16 having an exhaust vent 17, and adjacent the lower electrode 12 is a means 18 composed of thermally resistant material for closing the arc chamber. Pipe or conduit 19 conducts gas to be heated into the chamber 20 by way of passageway 29 in heat resistant closure means 18.

Lead means 21 is provided connected to electrode 11, and lead means 22 is provided connected to the electrode 12 for bringing an energizing potential to maintain an arc between the electrodes. As will be readily understood by those skilled in the art, a number of means may be employed for starting the arc between the electrodes; for example, one of the electrodes, or an arc starter not shown electrically connected thereto, may be made movable with respect to the other electrode, and to start the arc move up to a touching position, whereafter the electrode or the starter is returned to its normal operating position; a fuse wire may be connected between the electrodes; or ionized gas may be inserted into the chamber to "seed" the chamber.

In the ordinary operation of an arc of the type disclosed, coils 13 and 14 are so connected, or the polarities of the potentials applied thereto so chosen, that the fields oppose each other, and the result is a magnetic field substantially transverse to the path of the arc 23 between electrodes 11 and 12. If the field coils 13 and 14 are energized by direct current potential, so that the field produced by the coils does not reverse in direction, and if an alternating current potential is applied to the electrodes, in accordance with well known principles a force is applied to the arc which is substantially perpendicular to the arc path and which is also substantially perpendicular to the path of the magnetic field, and this force is in a direction to rotate the arc around the annular arcing surface of the electrodes. The force has a direction which depends upon the direction of the flow of arc current, and the force reverses in direction when the polarity of the potential applied between the electrodes reverses. Accordingly, every time the alternating current reverses in polarity the arc reverses its direction of rotation. Generally speaking, this periodic reversal of direction is desirable since it has a tendency to limit the speed of rotation of the arc and to prevent looping, etc. Similarly, a direct current potential may be applied between the electrodes and an alternating current potential may be applied to the field coils, to produce an arc which periodically reverses its direction of rotation. Furthermore, alternating current potentials may be applied to both the electrodes and the field coils.

As previously stated, my arc heater utilizes a rotating arc to convert electrical energy to thermal energy, and as previously stated, the interaction of the electric arc current and the magnetic field causes arc rotation. Where two alternating current potentials are applied to the field coils and the electrodes, the arc rotation direction is governed by the following law: the frequency of the change of rotation direction is equal to the difference between the arc current frequency and the field current frequency.

Apparatus embodying my invention makes use of the above law by varying the field current frequency for particular applications of the arc heater. Control of the number of revolutions which the arc will make before reversing the direction of rotation is therefore obtained.

Particular reference is made now to FIG. 2. Rectifier apparatus shown in block form at 25 is energized from a three phase alternating current source by leads 26, 27 and 28, and the resulting direct current output is applied by way of leads 31 and 32 to an inverter circuit generally designated 33 which is controlled by the output signals from a variable frequency oscillator 34 supplying its control signals by way of leads 35, 36 and 37. The variable frequency alternating current output of the inverter 33 is supplied by way of the leads 81 and 82 to the arc heater magnetic field coils 13'.

In FIG. 1, the circuit of the inverter 33 and variable frequency oscillator 34 of FIG. 2 are shown in greater detail. Whereas the inverter circuit of FIG. 1 is suitable for use in the invention, and is a convenient, economical and efficient way of getting the necessary variable frequency alternating current, it will be understood that other circuits could be employed. For example, a circuit similar to that shown in Patent No. 3,118,105 to A. E. Relation et al., issued January 14, 1964, and assigned to the assignee of the instant invention, could be employed. Also commercially available equipment could be employed, such as for example a static inverter manufactured and sold by the assignee.

In FIG. 1, four controlled rectifiers which may be silicon controlled rectifiers are shown at 41, 51, 61 and 71, the rectifier 41 having anode 42, cathode 43 and control element 44, rectifier 51 having anode 52, cathode 53 and control element 54, rectifier 61 having anode 62, cathode 63 and control element 64, and rectifier 71 having anode 72, cathode 73 and control element 74. Anodes 42 and 52 are both connected to lead 46 and thence by way of inductor 47 and lead 48 to the positive terminal of rectifier 25. Cathode 43 is connected to lead 81' which is connected to one terminal of coil 13, and lead 81' is also connected to anode 62 of controlled rectifier 61. The cathode 63 of rectifier 61 is connected to lead 66, thence by way of inductor 67 and lead 68 to the negative output lead or terminal of the aforementioned rectifier 25.

As previously stated, lead 24 connects one terminal of coil 13 to one terminal of coil 14. The other terminal of coil 14 is connected to lead 82', lead 82' being connected to the cathode 53 of rectifier 51, the anode 52 of rectifier 51 being connected to the aforementioned lead 46. Lead 82' is also connected to the anode 72 of rectifier 71, and the cathode 73 of rectifier 71 is connected to the aforementioned lead 66.

As will be seen more clearly hereinafter, rectifiers 41 and 71 are rendered conductive during one alternation of the signal output of variable frequency oscillator 34', so that current flows from rectifier 25 through lead 48, through inductor 47, through lead 46, through rectifier 41, lead 81', coil 13, lead 24, coil 14, lead 82', rectifier 71, lead 66, inductor 67 and lead 68 back to the rectifier 25.

On the next alternation of the signal from variable frequency oscillator 34', rectifiers 51 and 61 are fired or rendered conductive in synchronism whereas rectifiers 41 and 71 are left in a nonconductive condition. As a result of gating rectifiers 51 and 61, current flows from rectifier 25 through lead 48, through inductor 47, through lead 46, through rectifier 51, lead 82', coil 14, lead 24, coil 13, lead 81', rectifier 61, lead 66, inductor 67, and lead 68 back to the negative terminal of the rectifier 25.

The various rectifiers 41, 51, 61 and 71 are rendered conductive by signals of positive polarity applied between the control elements and the cathodes thereof. The circuit for gating or firing rectifier 41 includes lead 81' connected to one end of secondary 49 of a dual secondary transformer generally designated 84, having primary 85 connected to be energized from the oscillator 34', the transformer 84 also having a secondary 79 coupled to primary 85 for purposes to be made hereinafter more clearly apparent.

The other end of the secondary 49 is connected by way of lead 45 to the control element 44 of rectifier 41.

As previously stated rectifier 71 is gated on during the same alternation of the control signal that rectifier 41 is gated or fired or triggered, and it is seen that the control element 74 of rectifier 71 is connected by way of lead 75 to one terminal of the aforementioned secondary 79 of the dual secondary transformer 84 having the primary 85, the other terminal of secondary 79 being connected to lead 66 which as previously stated is connected to the cathode 73 of controlled rectifier 71, and thus a circuit is completed whereby, when control element 74 is positive with respect to cathode 73, the rectifier 71 is triggered on. The simultaneous firing of rectifiers 41 and 71 completes a path for the flow of current through the series-connected coils 13 and 14 in one direction.

Also connected to be energized from the variable frequency controlled oscillator 34' is an additional transformer generally designated 87 having a primary 88 and having secondaries 59 and 69. One terminal of secondary 59 is connected by way of lead 56 to the control element 54 of rectifier 51, and the other terminal of the secondary 59 is connected to the lead 82', which as aforementioned is connected to cathode 53, so that when control element 54 is rendered positive with respect to cathode 53 the controlled rectifier 51 fires. The other secondary 69 has one terminal thereof connected to the aforementioned lead 66, and thence to cathode 63, and has the other terminal thereof connected by way of lead 65 to the control element 64 of controlled rectifier 61, the circuit providing for applying a positive signal between control element 64 and the aforementioned cathode 63 and gating or firing the rectifier 61. As previously stated, rectifiers 61 and 51 are triggered or gated in synchronism to provide for current flow through the series-connected coils 14 and 13 in the other direction.

Control 39 is used by the operator of the apparatus to control the frequency of the signal generated at 34'. Meter 110 may read this frequency, or, if direct current is used on the electrodes, or if the frequency of alternating current applied to the electrodes is constant, meter 110 may be calibrated to read directly the frequency at which the arc changes its direction of rotation.

Capacitor 90 is connected between leads 81' and 82', and it is seen that a first diode 91 is connected between lead 81' and the aforementioned lead 48, the anode of diode 41 being connected to lead 81' whereas the cathode is connected to lead 48. An additional diode 92 is connected between the lead 81' and the aforementioned lead 68 with the cathode of diode 92 connected to lead 81' and the anode of diode 92 connected to lead 68. A third diode 93 is connected between lead 82' and lead 48 with the anode of diode 93 connected to lead 82'. A fourth diode rectifier 94 is connected between lead 82' and the aforementioned lead 68, with the cathode of diode 94 connected to lead 82' and the anode of diode 94 connected to lead 68.

The diodes or rectifiers 91, 92, 93 and 94 are effectively connected in "anti-parallel" with the silicon controlled rectifiers 41, 61, 51 and 71, respectively. These diodes conduct the flow of reactive current between the time the respective valves or silicon-controlled rectifier become non-conductive, and at the time that they are rendered re-conductive. For a more detailed explanation of the operation of diodes 91, 92, 93 and 94, reference may be had to the aforementioned Patent No. 3,118,105.

In accordance with conventional practice and as taught in Patent No. 3,118,105, when using gated rectifiers, four diodes, not shown for convenience of illustration, could be added, one diode between the gate lead and the cathode of each silicon-controlled rectifier, the shunt-connected diodes preventing any substantial buildup of voltage in a direction tending to pass current from the cathode to the gate lead.

As will be readily understood by those skilled in the art, if silicon-controlled rectifiers are used at 41, 51, 61 and 71, to return the rectifiers to the blocking state, one of two methods may be employed; the anode current may be reduced below the holding current, or the polarity of the voltage between anode and cathode may be reversed.

The reactors 47 and 67 may assist in generating momentary voltages of opposite polarity of sufficient magnitude to extinguish the controlled rectifiers 41, 51, 61 and 71, suitable reactance values being provided throughout the circuit. The diodes 91, 92, 93 and 94 permit these reverse polarity voltages to be applied in the reverse direction across the silicon-controlled rectifiers to render them nonconductive.

To return the rectifiers 41, 51, 61 and 71 to nonconductive states, the currents may be reduced to zero, by providing a load having a negative phase angle, with the current going through zero before the voltage. It is noted that the load includes capacitor 90 in parallel with the inductance of coils 13–14. By suitable choice of capacity for 90 for the range of alternating current frequencies to be utilized, current may lead the voltage and the controlled rectifiers returned to the blocking condition as taught in Patent No. 3,118,105 and in chapter 7 entitled "Applications of Silicon Controlled Rectifiers," Silicon Controlled Rectifier Designers Handbook, published in 1963 by the Westinghouse Electric Corporation, Pittsburgh, Pa.

Reactors 47 and 67 may be omitted or replaced by current limiting resistors. The capacitor 90 and the reactors 47 and 67 also act to restore the waveform of the voltage or current passing through the coils 13 and 14. If desired an L–C filter network, not shown for convenience of illustration, can be connected in series with the field coils of the arc heater to improve the waveform further, and to provide the phase angle needed for returning the controlled rectifiers to blocking condition. Since it is generally desirable not to have the arc stop for too long a time interval between alternations or cycles, a pulsed waveform of current in the field coils is generally undesirable, since a considerable time interval might exist between current zero at one alternation and the beginning of current rise of the next alternation. During this interval the arc would remain at one spot with a danger of burning through the electrode.

The oscillator 34' may supply a sine wave output, or it may supply a pulsed output. If the output is to some extent pulsed in waveform, means is provided to produce a waveform approaching sinusoidal at the field coils.

The reactors 47 and 67 also provide a current limiting effect, and in some applications could be replaced by resistors, as previously stated. As previously stated, the reactors assist in restoring the wave shape to something approaching a sinusoidal waveform.

Electrodes 11 and 12 are connected by way of leads 21 and 22 and inductor 98 to the terminals of the secondary 99 of a transformer having a primary 100 connected by leads 101 and 102 to a suitable source of alternating current potential for supplying the current to generate and sustain the arc 23 between electrodes 11 and 12.

In utilizing the aforementioned apparatus embodying my invention, and recalling the basic law of the operation thereof, that the frequency of the change of rotation direction is equal to the difference between the arc current frequency and the field current frequency, depending upon the density, viscosity and electrical conductivities of gases at required temperatures, the frequency of rotation reversal is adjusted by varying the frequency of oscillator 34' to optimize the conditions for proper mixing and heating of the gas, and heating of the gas to uniform temperature.

The frequency is also adjusted to control the time of rotation in a given direction to limit the arc velocity thus minimizing the problem of arc looping. A more stable arc is also provided.

The frequency of reversal of rotation of my arc 23 is also controlled to avoid introducing temperature gradients in the heating chamber due to centrifugal effects on the gases. In this way, I avoid a hot central core at the nozzle 17.

I also, by providing a frequency which provides sufficient stirring action, reduce temperature variations in the gas exhausted from the nozzle 17.

The invention is especially important when stringent uniformity conditions exist in the application of the apparatus, and especially where the operating temperatures are high, and is also particularly useful when various media will be heated, such as in chemical processing.

Figure 3:
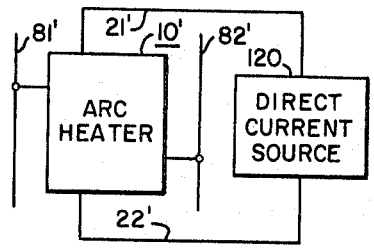
FIG. 3 is a fragmentary view of my invention according to a second embodiment thereof in which a direct current produces and sustains the arc between electrodes.

Particular reference is made now to FIG. 3, in which a second embodiment of my invention is shown utilizing direct current on the electrodes. In FIG. 3, arc heater generally designated 10' may be similar to arc heater 10 of FIG. 1. Coil 13 of arc heater 10' is connected to lead 81', and coil 14 of arc heater 10' is connected to lead 82', leads 81' and 82' having an alternating current potential of adjustable frequency applied thereto. Leads 21' and 22' are connected to electrodes 11 and 12 respectively of arc heater 10', and are connected to a direct current source 120.

In FIG. 3, the arc between electrodes 11 and 12 reverses its direction of rotation once per alternation of the frequency of the potential applied to leads 81' and 82', that is, at a rate twice the frequency of the current energizing the field coils.

My invention includes the use of a direct current on the field coils and a variable frequency alternating current between electrodes. However, for high power arc heaters of the megawatt range, it may not be convenient to provide 10,000 or more amperes of current at a variable frequency.

There has been provided then apparatus well suited to accomplish the aforementioned objects of my invention.

"Surface of opposite polarity" as used herein includes the melt of a furnace as well as another electrode.

As previously stated, my invention is suitable for use in arc heaters of the type in which a magnetic field coil is disposed within an electrode, such for example as the electrode described and claimed in the copending application of A. M. Bruning for "Electric Arc Furnace and Nonconsummable Electrode for Use Therein," Serial Number 407,332, filed October 29, 1964, and assigned to the assignee of the instant invention, and my invention is suitable for use with the electrode described and claimed in the copending application of S. M. DeCorso and C. B. Wolf for "Nonconsummable Arc Electrode" Serial Number 407,327, filed October 29, 1964, and assigned to the same assignee.

Whereas I have shown and described my invention with respect to two embodiments thereof which give satisfactory results, it should be understood that changes may be made and equivalents substituted without departing from the spirit and scope of the invention.

I claim as my invention:

1. In arc heater apparatus, in combination, a pair of spaced electrodes, means for admitting gas to be heated to the space between electrodes, means for exhausting heated gas, means for applying an alternating current potential as a first frequency to said electrodes to establish and maintain an arc therebetween, field coil means disposed in predetermined position with respect to the electrodes, and means for applying an alternating current of an adjustable second frequency to the field coil means to set up an arc-rotating magnetic field which varies periodically in direction, the frequency of the change of rotation direction of the arc being substantially equal to the difference between the first frequency and the second frequency, said second frequency being adjusted to a value which produces a frequency of the change of rotation whereby most efficient stirring action of the gas is produced with a minimum amount of temperature variation within the gas content, and the arc is stabilized to prevent arc looping.

2. Apparatus according to claim 1 in which the means for applying an alternating current of adjustable second frequency to the field coil means includes four controlled rectifiers, circuit means including a source of direct current potential connecting said four controlled rectifiers to the field coil means, and means for selectively rendering pairs of the rectifiers conductive in synchronism, a first pair of rectifiers when rendered conductive completing a circuit for passing current through the field coil means in one direction, the second pair of controlled rectifiers when rendered conductive completing a circuit for passing current through the field coil means in the opposite direction.

3. Arc heater apparatus comprising, in combination, means forming an arc chamber, means for admitting gas to be heated into the arc chamber, means for exhausting heated gas from the arc chamber, first and second spaced annular electrodes disposed in the chamber, magnetic field generating means including coil means disposed in the chamber in predetermined position with respect to the first and second electrodes, means for applying an alternating current potential of a first frequency between the first and second electrodes to generate and sustain an arc therebetween, and means for applying an alternating current potential of a variable adjustable second frequency to the coil means of the magnetic field generating means, the magnetic field produced by the field coil means being transverse to the arc path and causing the arc to move about the annular surface of the first and second electrodes, the frequency of the change of rotation direction being equal to the difference between the first frequency and the second frequency, the frequency of the change of rotation being adjusted to a value by adjusting the second frequency in accordance with the rate of gas flow, the density, viscosity and electrical conductivity of the gas which optimizes uniform heating of the gas.

4. In arc heater apparatus having a pair of spaced annular electrodes and having a direct current potential applied to the electrodes to sustain an arc therebetween, means for admitting gas to be heated to the space between electrodes, means for exhausting heated gas, the combination of magnetic field coil means disposed in predetermined position with respect to the electrodes, and means for applying to the field coil means an alternating current potential of a variable adjustable frequency, the magnetic field causing the arc to rotate around the electrodes, the alternating current potential applied to the field coil means causing the direction of arc rotation to change at a frequency equal to twice the frequency of said alternating current potential, the frequency of the change of direction of arc rotation being adjusted to a value which insures uniform heating of the gas and stabilizes the arc.

5. Arc heater apparatus comprising, in combination, means forming an arc chamber, means for admitting gas to be heated into the chamber and for exhausting heated gas from the chamber, first and second spaced annular electrodes in the chamber having an alternating current potential of a first frequency applied thereto to sustain an arc between the first and second electrodes, magnetic field coil means disposed in the chamber in predetermined position with respect to the first and second electrodes for setting up a magnetic field adjacent the arcing surfaces of the first and second electrodes, a three phase source of alternating current potential, direct current rectifier means connected to said source and providing a direct current output, inverter means having the direct current potential applied thereto, and a variable frequency control oscillator connected to the inverter means, the inverter means being connected to the magnetic field coil means to provide an energizing potential thereto, the inverter means being constructed and arranged to convert the direct current potential applied thereto to an alternating current of a variable second frequency in accordance with the frequency of the signal output of the control oscillator, the magnetic field adjacent the electrodes causing the arc therebetween to rotate around the arcing surfaces of the electrodes, the frequency of the change of rotation direction of the arc being equal to the difference between the first frequency and the second frequency, the frequency of the change of rotation direction being adjusted by the control oscillator to a value which insures uniform heating of the gas without substantial temperature gradients in the gas content.

6. Electrode apparatus comprising, in combination, an annular electrode face member, at least one passageway through the annular electrode face member for the flow of the cooling fluid therethrough, means for applying and alternating current potential of a first frequency to the electrode face member to produce and sustain an arc between the electrode face member and a surface of opposite polarity, and a coil disposed adjacent the electrode face member, the coil when energized setting up a magnetic field substantially transverse to the arcing surface of the electrode face member and transverse to the path of said arc, said magnetic field applying a force to the arc which causes the arc to move around the annular surface of the electrode face member, the means for energizing the coil including a source of alternating current potential of a variable adjustable second frequency, the change of direction of rotation of the arc occurring at a frequency which is equal to the difference between the first frequency and the second frequency, the second frequency being adjusted to a value which stabilizes the arc and prevents arc looping.

7. In a variable frequency magnetic field arc heater having an electrode and coil means disposed adjacent the electrode for setting up a magnetic field to cause the arc to move on the arcing surface of the electrode, apparatus for causing the direction of movement of the arc to periodically vary at an adjustable frequency, the opparatus including in combination a source of direct current potential, first and second controlled rectifiers, first circuit means connecting the first and second controlled rectifiers and the coil means in series across the source of direct current potential, the first circuit means including means for firing the first and second controlled rectifiers in synchronism and producing a current path in one direction through the coil means to set up a magnetic field of one polarity at the arcing curface, and second circuit means including third and fourth controlled rectifiers connecting the coil means to the source of direct current potential, the second circuit means including means for firing the third and fourth controlled rectifiers in synchronism at a predetermined instant when the first and second controlled rectifiers are not conductive and causing current to flow through the coil means in the opposite direction to set up a magnetic field of the opposite polarity at the arcing surface, reversals in the direction of the magnetic field causing reversals in the direction of rotation of the arc.

8. Apparatus according to claim 7 wherein the first, second, third and fourth controlled rectifiers each has a control element and a cathode, the means for firing the first and second controlled rectifiers in synchronism and the means for firing the third and fourth controlled rectifiers in synchronism includes a variable frequency signal generator, and first and second transformer means energized by signals from the signal generator for rendering the control elements of the first, second, third and fourth rectifiers selectively positive with respect to the cathodes of the first, second, third and fourth rectifiers respectively to periodically vary the direction of the flow of current through the coil means.

9. Apparatus according to claim 7 including, in addition, inductor and capacitor means in the first and second circuit means for causing the waveform of the current flowing through the coil means to approach a sinusoidal waveform.

10. Variable frequency magnetic field arc heater apparatus comprising, in combination, means forming an arc chamber, first and second annular water cooled electrodes in said chamber, means for admitting gas to be heated into said chamber, means for exhausing heated gas from the chamber, heat shield means for preventing direct radiation from the arc and incandescent gases in the chamber from reaching the walls of the chamber forming means, a first coil disposed within the first electrode and a second coil disposed within the second electrode, means for applying an alternating current potential of a first frequency between the first and second electrodes to sustain an arc therebetween, and circuit means including a source of potential connecting the first and second coils whereby when the first and second coils are energized a magnetic field is set up substantially transverse to the annular arcing surface of the first and second electrodes and substantially transverse to the arc path between the electrodes resulting in a force exerted on the arc which causes the arc to move around the annular arcing surfaces of the first and second electrodes, said source of potential including means for applying an alternating current potential of a second adjustable frequency to the first and second coils, the rotation direction of the arc changing at a frequency equal to the difference between the first frequency and the second frequency.

11. Apparatus according to claim 10 in which the means for applying an alternating current potential to the first and second coils includes a direct current source of potential, a variable frequency signal generator, and inverter means connected to the source of direct current potential, to the variable frequency signal generator, and to the first and second coils, the inverter means changing the direct current into a pulsating alternating current at a frequency in accordance with the frequency of the signal from the signal generator.

References Cited
UNITED STATES PATENTS

| | | | |
|---|---|---|---|
| 3,048,736 | 8/1962 | Emmerich | 315—111 |
| 3,213,260 | 10/1965 | Hammer | 219—123 |
| 3,229,155 | 1/1966 | Carlson | 315—111 |
| 3,258,674 | 6/1966 | Relation et al. | 321—45 |

JAMES W. LAWRENCE, *Primary Examiner.*

DAVID J. GALVIN, ROBERT SEGAL, *Examiners.*

R. JUDD, *Assistant Examiner.*